United States Patent Office 3,508,783
Patented Apr. 28, 1970

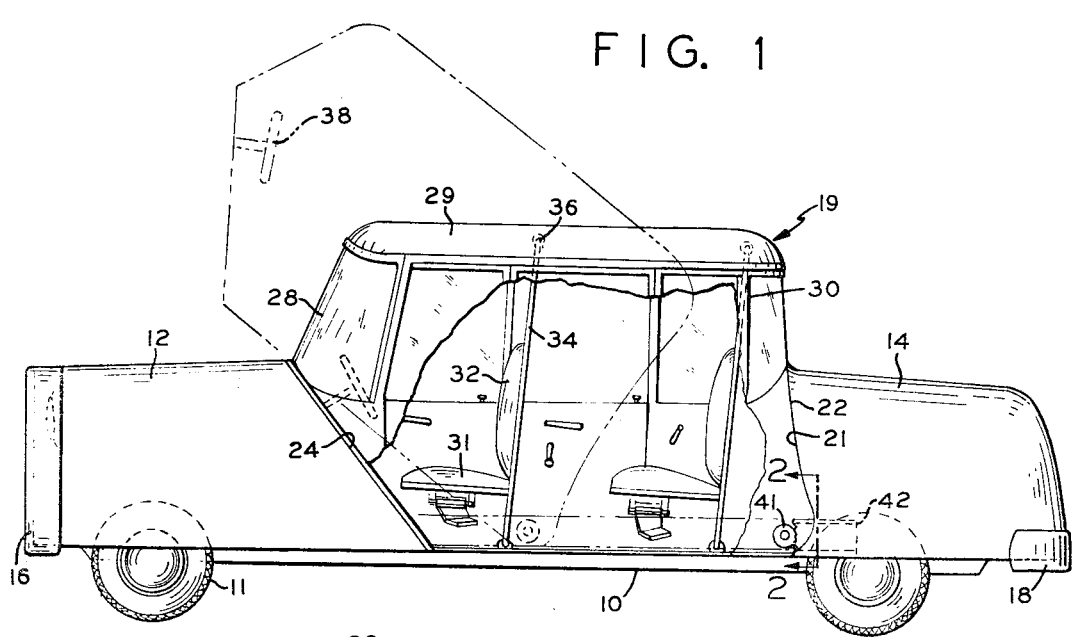

3,508,783
SAFETY VEHICLE
Samuel L. Schlanger, 120–126 Sutton St.,
Brooklyn, N.Y. 11222
Filed Apr. 22, 1968, Ser. No. 723,131
Int. Cl. B62d 39/00
U.S. Cl. 296—35
4 Claims

ABSTRACT OF THE DISCLOSURE

A vehicle wherein the body is in the nature of a capsule provided with seats and doors and which, upon impact at the front end of the vehicle is released for forward and upward movement while the rear end of the body moves forward a limited distance. A wall fixed at the rear of the motor housing which is inclined forwardly at an angle of about 45°, and the body is formed with a front wall inclined at the same angle as said fixed rear wall of the housing and normally contacting the same. The inclined wall cams the forward end of the body upwardly upon impact with an object.

---

This invention relates to improvements in vehicles to provide a greater safety factor when a head-on collision occurs, than is provided in conventional automobiles.

The use of a safety belt or harness has to a large extent prevented a rider from being hurled through the vehicle windshield in the event of a collision with a moving or a fixed object, but there is nevertheless a sharp impact due to the sudden halt and without any opportunity for deceleration. Efforts have been made to cushion the blow in some fashion as by the provision of some form of "safety seat" such as is shown in Pat. Nos. 2,736,566 and 2,970,862, where means connected with a retractable front bumper are provided for tipping the seat rearwardly and raising the cushion to a more nearly vertical position on impact where it acts as a barrier to forward travel of the rider.

The matter of increasing the safety factor in the event of collision is a question of timing and the safety seats of this character cannot function fast enough to save lives.

An important object of the present invention is to greatly increase the safety of the riders by providing a car body carried by the frame which is releaseable from its fixed position or the frame to permit limited forward and upward travel with suitable means for deceleration so that by the time the forward end of the body, which is in the nature of a capsule, has travelled this limited forward distance, and upwardly, the rider is moving at a much slower speed and the seats, fixed within the body, are in the ideal position to bring the rider's body to a halt without an impact blow.

Another object of the invention is to provide an automatic release for the car body which is positive in action and acts far more quickly than a normal reaction to a situation presented by another car on collision course with your own, and to provide means deactivating the release if, for any reason, the driver decides not avail himself of the release mechanism.

To this end, the motor compartment is fixed to the chassis or frame in the usual fashion and at the rear of the motor compartment there is a frame structure or wall which instead of being vertical is inclined forwardly at an angle of 40°–45° to the vertical and forms a cam surface engaged by the forward end of the body, inclined at the same angle, and which cams the body upwardly upon impact.

During normal travel of the car, the body in the nature of a capsule is secured to the frame but automatic release of the securing means is effected upon impact or just before impact, and a sliding connection between the rear of the body and the frame assures straight line forward travel of the body upon impact and at the same time a suitable braking action restrains this forward travel so that by the time the lower rear surface of the capsule has reached the inclined fixed frame structure the forward movement ceases. Of great importance is the fact that this forward and upward travel of the front end of the body causes the seats to change this angular position by tilting the seat and seat back rearwardly about 40°. This rearward tilting movement to a position which is most ideal from a safety point of view, is accompanied by a rapid deceleration and, equally important, it moves the driver and occupants away from the horizontal crash position which they would occupy in a conventional automobile.

Most important, however, is the fact that the change in position is accomplished in one fluid motion accompanied by simultaneous straight line forward travel of the rear section of the capsule type of body and raising of the forward section thereof. The connection between the car body and the car frame or chassis is sufficiently rugged to retain the body captive on the chassis at all times but if the impact were, perchance, so great as to shear this connection and the body were to travel free of the chassis a short distance, there would be no head-on collision.

In the drawing:

FIG. 1 is a side elevation of a vehicle constructed in accordance with the present invention;

FIG. 2 is a broken section taken on line 2—2 of FIG. 1;

FIG. 3 is a side elevation and showing the body or capsule, in its forward and raised position after impact;

FIG. 4 shows the connection between the front bumper and a shear pin which normally keeps the body secured in place;

FIG. 5 is a section taken on line 5—5 of FIG. 3.

The vehicle may have a generally conventional appearance and includes a frame or chassis 10, wheels 11, a hood 12 enclosing the motor (not shown), a trunk 14 fixed to the chassis, and front and read bumpers 16 and 18. The self-contained body 19 in the nature of a capsule has a frame, including a lower frame section 20, of a length to fit in the area of the chassis defined at the rear by a forward wall 21 of the trunk having the same contour as the rear wall 22 of the body. The body receiving area is defined at the front by a wall 24 which is inclined forwardly at an angle of about 40°.

The body is supported on a main lower frame 25 and has a lower front section defined by a wall 26 which is normally in face-to-face contact with inclined wall 24, the latter acting as a camming surface for moving the forward section of the body upwardly upon impact. A windshield 28 is positioned at the upper front section of the body and a top 29 and sides 30 are fashined to resemble a conventional automobile body. Front and rear seats 31 and back cushions 32 may be supported on generally vertical base 34 secured at 36 to the upper body frame and at 37. A steering gear shown at 38 is mounted on a steering post 39 formed with a rear section 39 and a front section 40 aligned therewith and which is detachable along with the other operating controls in the event of impact. The capsule is guided at the rear during its forward travel relative to the chassis by any suitable means, such as opposed C shaped trackways or channels 42 fast on frame 10 and rollers 44 mounted on shafts 42 carried by the body. A pair of curved arms 45 pivotally carried by the body 19 are received in sockets 46 fixed or pivoted within a rear frame supporting the trunk. The forward end of each arm is pivoted at 48 to the body. Free forward travel of each arm in the socket is restrained by means of an adjustable braking element 49 which engages an edge of the arm. A screw 51 effects the adjustment. When the rollers 44 reach the forward end of the C shaped trailways, they are still captive in the trackways, thus limiting further forward travel of the car body. A second positive stop is a stop pin 52 which limits movement of the arm in the socket.

The front section of body 19 is secured in fixed relation on the frame by means of pins 53, each of which pass through a two part sleeve, one part 54 being secured in fixed relation within the engine compartment 12 forwardly of diagonal wall 24. The other part 56 is secured to the body frame to the rear of diagonal wall 26. The pins are downwardly inclined and the relationship of the parts is such that so long as the pins are in place, the body is secured against any forward movement.

The front bumper is mounted on rods 58 which, on impact, can move rearwardly a short distance. The rods are mounted for this sliding movement in tracks 60 and stop 61 on the rods limit rearward movement. A centrally pivoted lever 62 is connected to a pivot pin 64 and the upper end of the lever connected at 66 to lever 68 to which pin 52 is secured. Thus, when the front bumper strikes a fixed or moving object it moves rearwardly and pin 53 is drawn forwardly, freeing the body for forward and upward travel.

There is shown at 70 a solenoid with leads 71 which when connected with a battery draws pin 64 away from connection between rod 58 and lever 62. This is a last instant means for inactivating the apparatus just prior to impact should the driver elect to do so.

In other words, the automatic release upon serious impact has an element of manual control which must of necessity be included in a safety system like the instant one. This circut may include means for manual setting of the system to be ready for operation after a devised speed has been attained.

The circuit may also include means for setting the brakes and cutting off the ignition, as well as connecting flash lights after impact to warn other motorists.

The front bumper 16' shown in FIG. 4 is of lesser depth than the bumper 16 shown in FIGS. 1 and 3. The invention is not, of course, limited to a front bumper of any specific depth. In fact the latter are shown as extending upwardly to a point above the headlights and will, of course, have appropriate openings for ventilation and for the light beams from the headlights.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A vehicle provided with a body in the nature of a capsule provided with seats and doors and which, upon impact at the front end of the vehicle, is released for forward and upward movement, and comprising a frame including a chassis provided with wheels, a propulsion unit at the front of the frame and enclosed within a housing, a wall fixed at the rear of said housing which is inclined forwardly at an angle of about 45°, the body being formed with a front wall inclined at the same angle as said fixed rear wall of the housing and normally contacting the same, the latter being arranged to cam the forward end of the body upwardly upon impact with an object, means connecting the rear end of the body with the chassis to limit movement of the body to straight-line forward sliding movement relative to the chassis and including cooperating rails and rollers carried by the members, wherein the forward end of the body is locked to the frame by locking means releasable on impact, said locking means comprising pins passing through aligned two-part sleeves, one part being fixed within the frame the other within the body, and a front bumper mounted on the frame for limited rearward travel on impact and a linkage connects the bumper and the pins to withdraw the latter on impact.

2. The structure recited in claim 1 wherein means are provided between the rear of the body and the frame for limiting forward travel of the body.

3. The structure recited in claim 2 wherein said means comprising arms pivoted to the body and sockets secured in the frame receiving the arms with stop means between the arms and the sockets.

4. The structure recited in claim 1 wherein means are provided for manually disengaging the connection between the pins and the bumper.

References Cited

UNITED STATES PATENTS

| | | | |
|---|---|---|---|
| 1,141,248 | 6/1915 | Kadlec | 296—35 |
| 2,446,609 | 8/1948 | Reed | 244—140 X |
| 2,929,637 | 3/1960 | Papacosta | 296—65 X |
| 3,162,479 | 12/1964 | Hewitt | 296—35 |

FOREIGN PATENTS

| | | |
|---|---|---|
| 688,634 | 6/1964 | Canada. |
| 705,020 | 3/1931 | France. |

LEO FRIAGLIA, Primary Examiner

J. A. PEKAR, Assistant Examiner

U.S. Cl. X.R.

293—37, 63